US00RE46061E

(19) United States
(12) Reissued Patent
Kroll

(10) Patent Number: US RE46,061 E
(45) Date of Reissued Patent: Jul. 12, 2016

(54) CROSS-SHAPED DISPLAY STAND

(71) Applicant: William F. Kroll, Boca Raton, FL (US)

(72) Inventor: William F. Kroll, Boca Raton, FL (US)

(21) Appl. No.: 29/528,408

(22) Filed: May 28, 2015

Related U.S. Patent Documents

Reissue of:
(64) Patent No.: Des. 658,908
Issued: May 8, 2012
Appl. No.: 29/400,201
Filed: Aug. 24, 2011

U.S. Applications:
(62) Division of application No. 29/463,816, filed on Mar. 12, 2014, now Pat. No. Re. 45,622, which is an application for the reissue of Pat. No. Des. 658,908.

(51) LOC (10) Cl. ..... 06-04
(52) U.S. Cl.
USPC ..... D6/674
(58) Field of Classification Search
USPC ..... D6/300–314, 674; D20/15; D11/157, D11/125, 122; D99/5, 23, 27; D26/4, 94
CPC ..... A47G 3/00; A47G 33/02
See application file for complete search history.

(56) References Cited

U.S. PATENT DOCUMENTS

| | | | | | |
|---|---|---|---|---|---|
| D67,289 | S | | 5/1925 | Ladewich | |
| D103,027 | S | * | 2/1937 | Slattery | D99/27 |
| D137,421 | S | * | 3/1944 | Rasmussen | D99/23 |
| D159,891 | S | * | 8/1950 | Chevalier | D99/27 |
| D160,900 | S | * | 11/1950 | Suhren | D6/450 |
| D168,686 | S | * | 1/1953 | Hunter | D6/450 |
| D256,398 | S | | 8/1980 | Mitchell | |
| D338,081 | S | * | 8/1993 | Klaffer | D26/94 |
| D338,315 | S | | 8/1993 | Larson | |
| 5,255,170 | A | * | 10/1993 | Plamp | A47G 33/02 362/121 |

(Continued)

*Primary Examiner* — Phillip S Hyder
(74) *Attorney, Agent, or Firm* — Mark D. Bowen; Malin Haley DiMaggio & Bowen, P.A.

(57) CLAIM

The ornamental design for a cross-shaped display stand, as shown and described.

DESCRIPTION

FIG. 1 is a front perspective view of a cross-shaped display stand in accordance with the present invention;
FIG. 2 is a bottom perspective view thereof;
FIG. 3 is a front *elevation* view thereof*, with the rear view being identical*;
FIG. 4 is a right side *elevation* view thereof, with the left side *elevation* view being [identical] *a mirror image*;
FIG. 5 is a top *plan* view thereof; [and,]
FIG. 6 is a bottom *plan* view thereof[.]*;*
*FIG. 7 is a front perspective view of second embodiment cross-shaped display stand in accordance with the present invention;*
*FIG. 8 is a rear bottom perspective view thereof;*
*FIG. 9 is a front elevation view thereof, with the rear view being identical;*
*FIG. 10 is a right side elevation view thereof, with the left side elevation view being a mirror image;*
*FIG. 11 is a top plan view thereof; and,*
*FIG. 12 is a bottom plan view thereof.*
*The dash-dash broken lines in FIGS. 1 through 12 depict portions of the cross shade display stand in which the design is embodied that are not considered part of the claimed design. The dot-dash broken lines in FIGS. 7 through 12 represent the boundaries between the claimed and non-claimed subject matter.*

1 Claim, 8 Drawing Sheets

Matter enclosed in heavy brackets [ ] appears in the original patent but forms no part of this reissue; matter printed in italics indicates the additions made by reissue.

(AMENDED)

(56) References Cited

U.S. PATENT DOCUMENTS

| | | | | | |
|---|---|---|---|---|---|
| D370,282 | S | * | 5/1996 | Grether | D11/122 |
| D379,330 | S | * | 5/1997 | Krizan | D11/96 |
| D402,586 | S | * | 12/1998 | Johnson | D11/131 |
| D408,653 | S | * | 4/1999 | Dotson et al. | D6/450 |
| D412,461 | S | * | 8/1999 | McGrew | D11/122 |
| 6,082,880 | A | * | 7/2000 | Nerlino | A47G 33/02 362/121 |
| D429,351 | S | * | 8/2000 | Grether | D26/25 |
| D431,206 | S | * | 9/2000 | Byers | D11/125 |
| D440,734 | S | * | 4/2001 | Berry | D99/23 |
| D443,970 | S | * | 6/2001 | Stucker | D99/27 |
| D481,223 | S | * | 10/2003 | Locker et al. | D6/470 |
| D518,939 | S | * | 4/2006 | Borgerding | D99/5 |
| D578,275 | S | | 10/2008 | Shantz et al. | |
| D600,156 | S | * | 9/2009 | Gersh | D11/89 |
| D618,135 | S | * | 6/2010 | Horst | D11/157 |
| D619,926 | S | * | 7/2010 | Letney | D11/157 |
| D649,594 | S | * | 11/2011 | Yi et al. | D20/15 |
| D654,828 | S | | 2/2012 | Piric | |
| D685,675 | S | | 7/2013 | Dubow | |

* cited by examiner

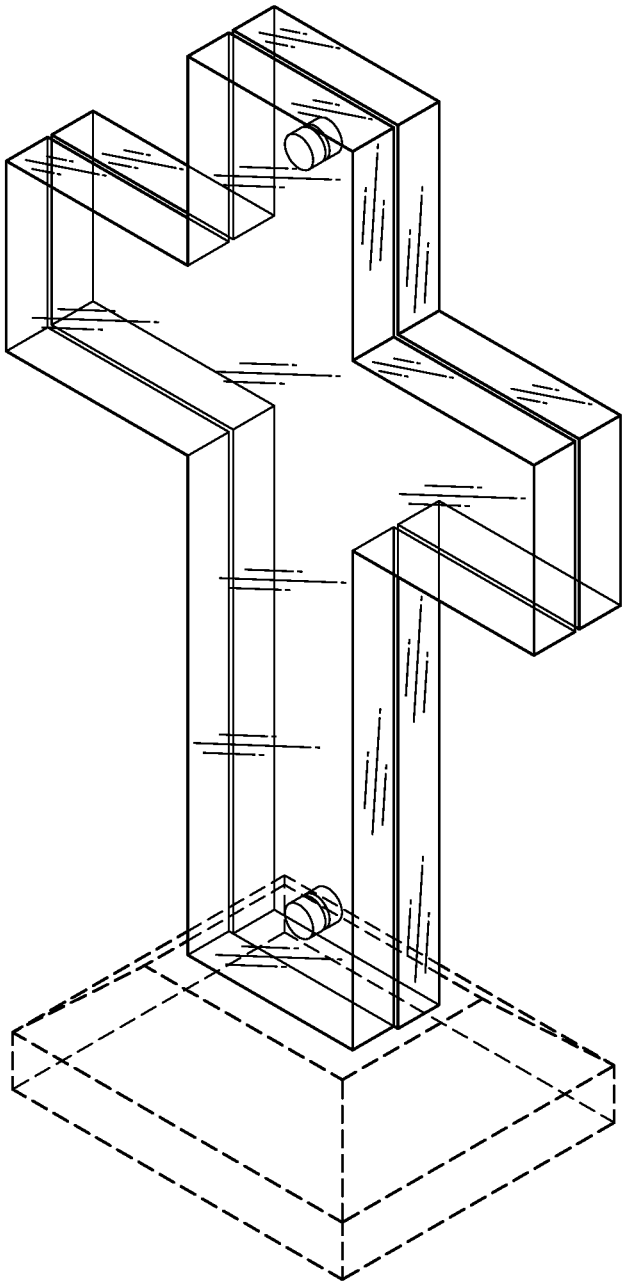
FIG. 1
(AMENDED)

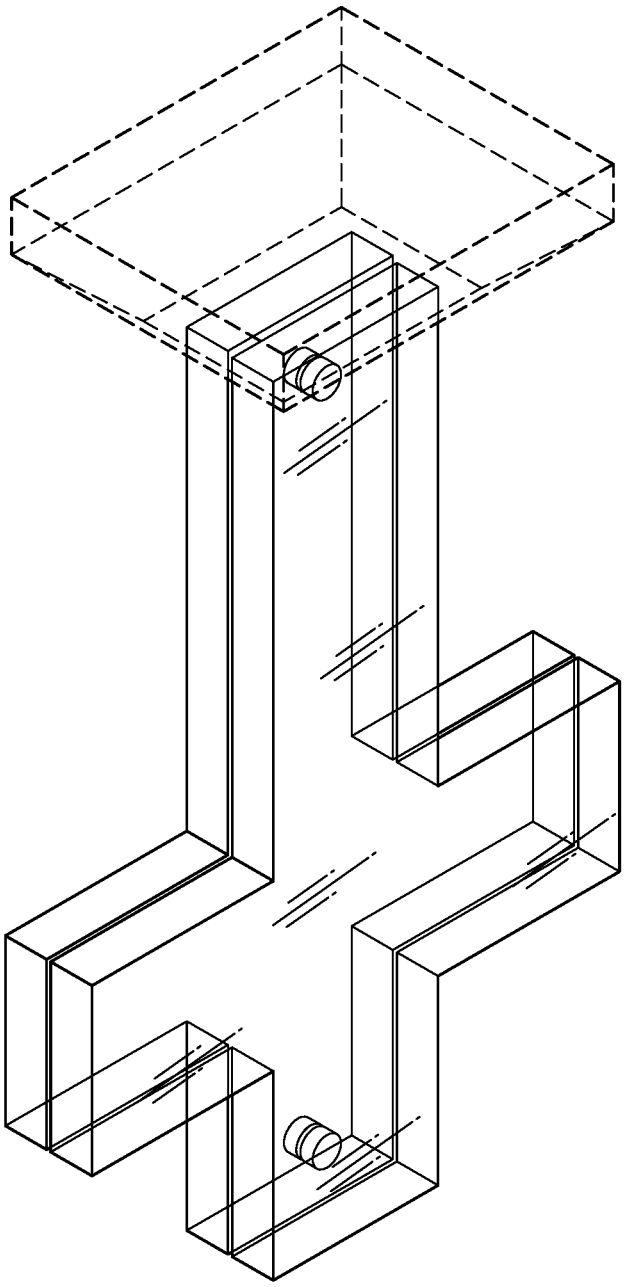
FIG. 2
(AMENDED)

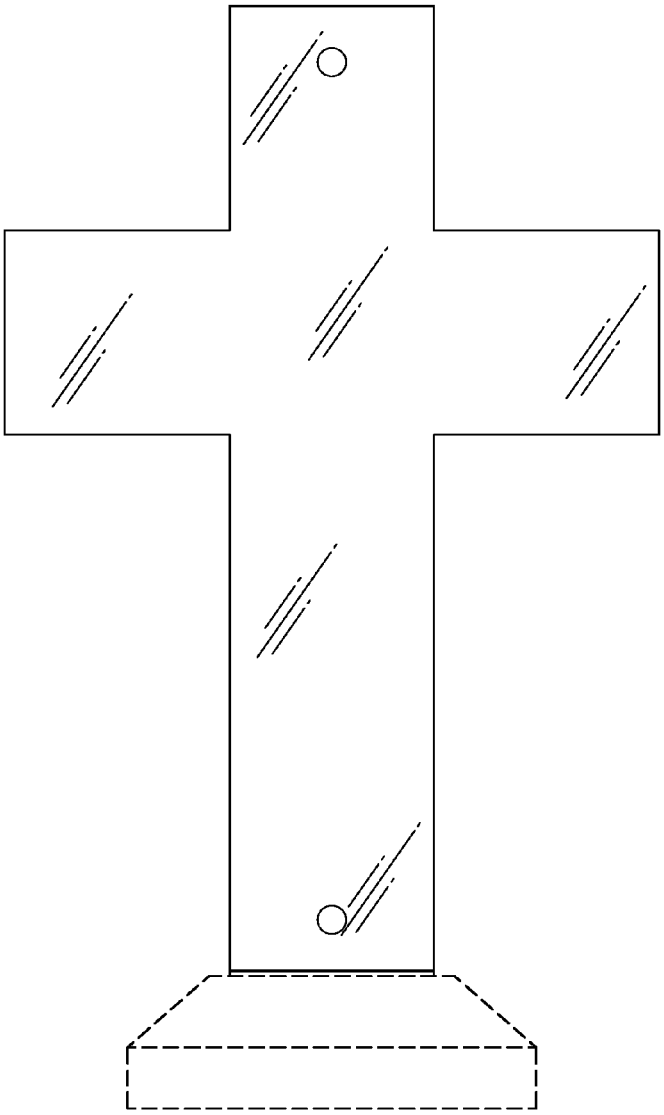
FIG. 3
(AMENDED)
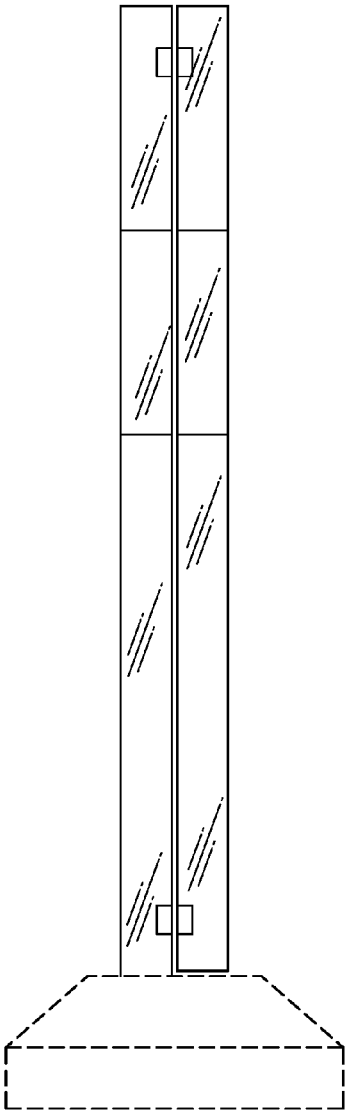
FIG. 4
(AMENDED)

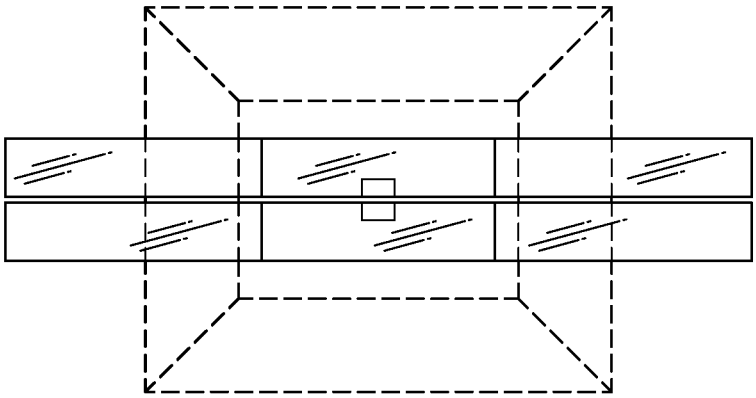
FIG. 5
(AMENDED)
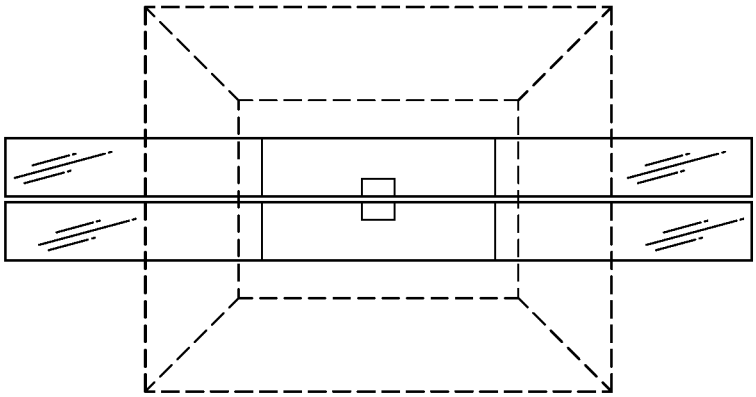
FIG. 6
(AMENDED)

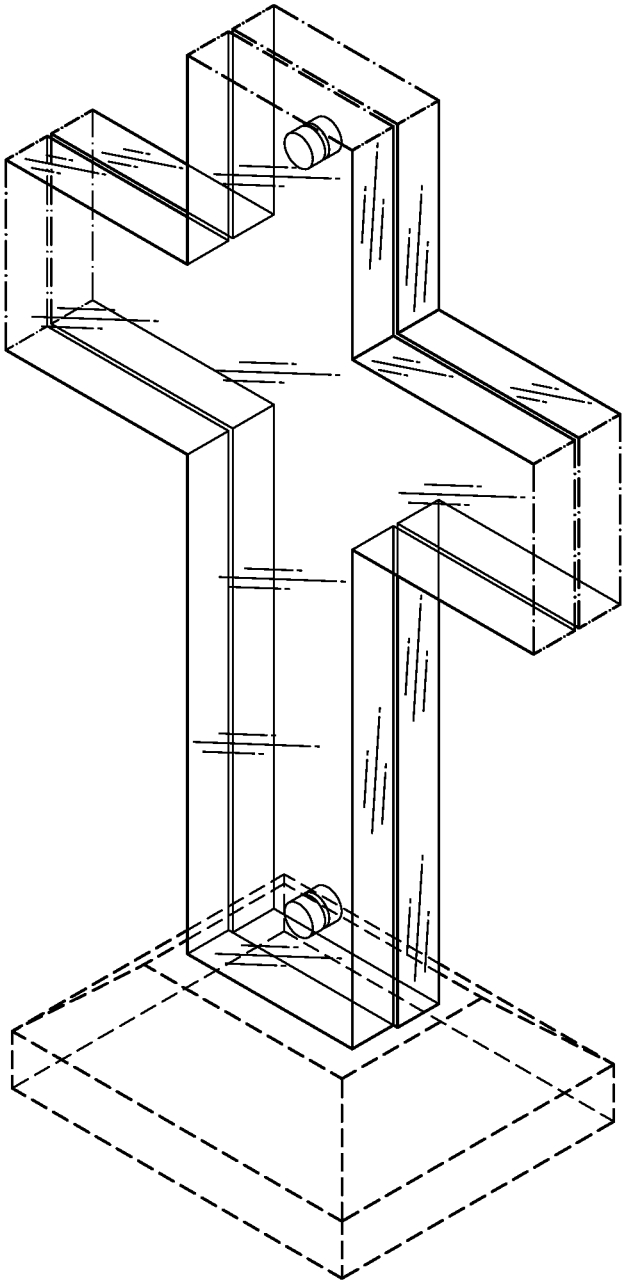
FIG. 7
(AMENDED)

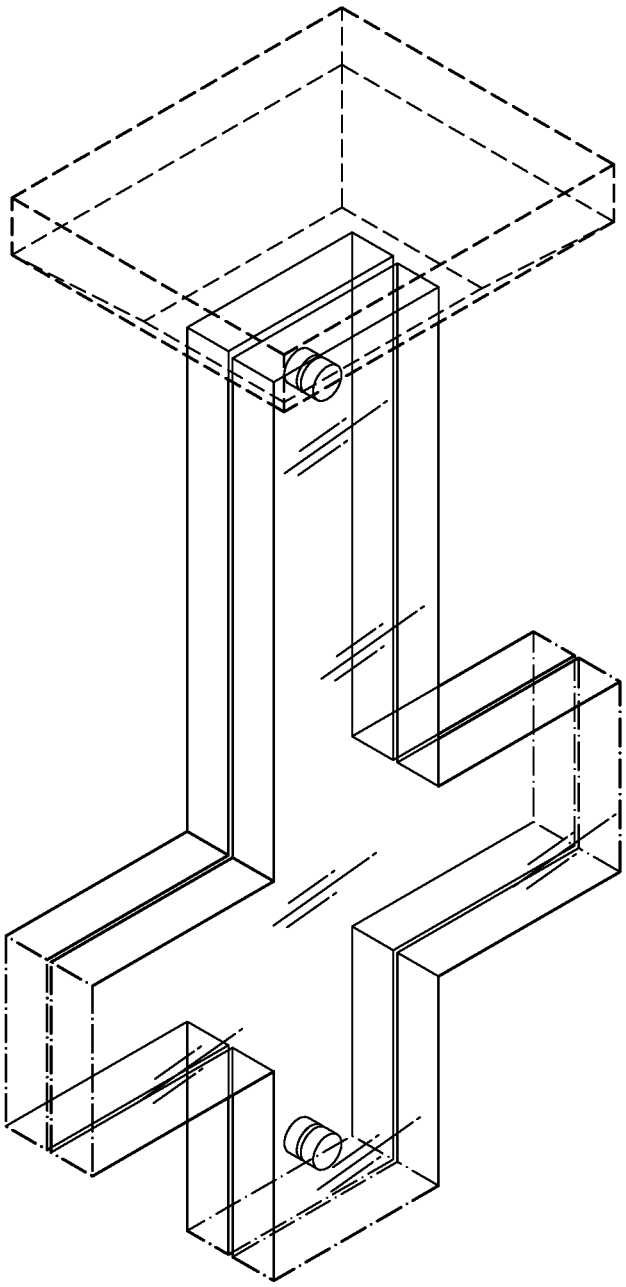
FIG. 8
(NEW)

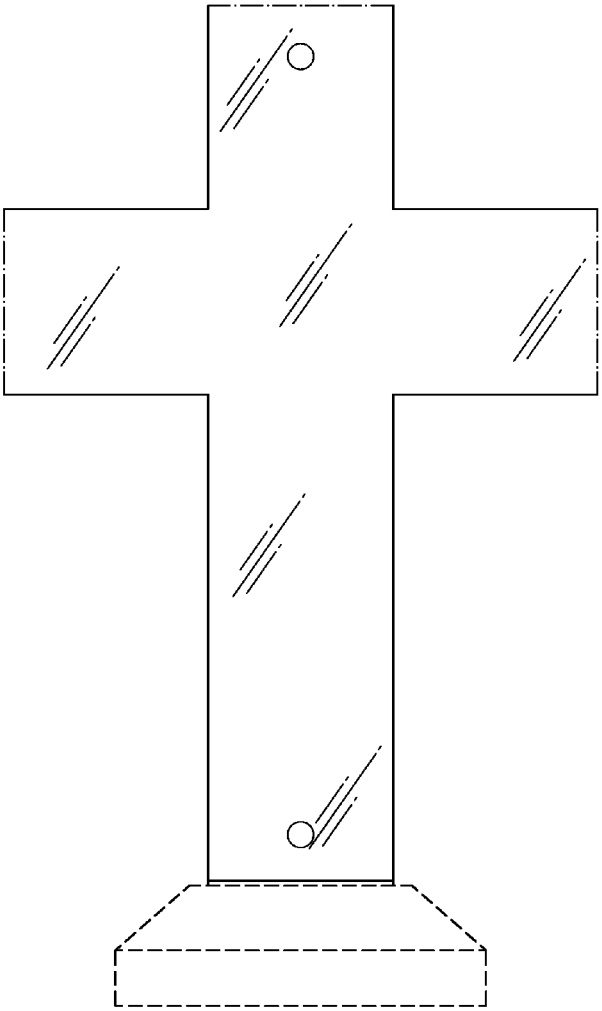
FIG. 9
(NEW)
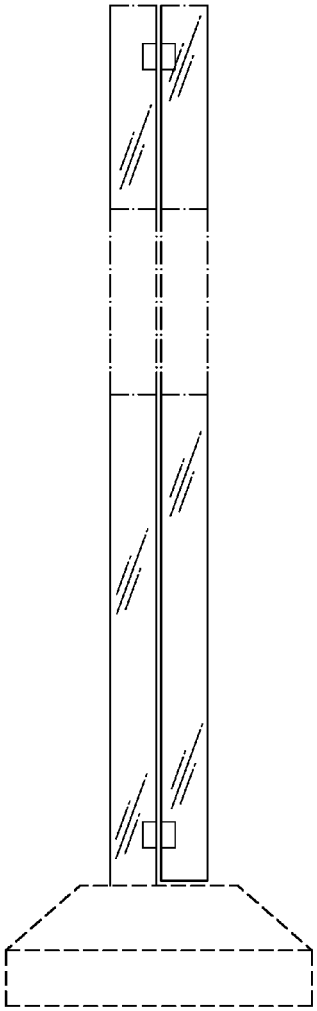
FIG. 10
(NEW)

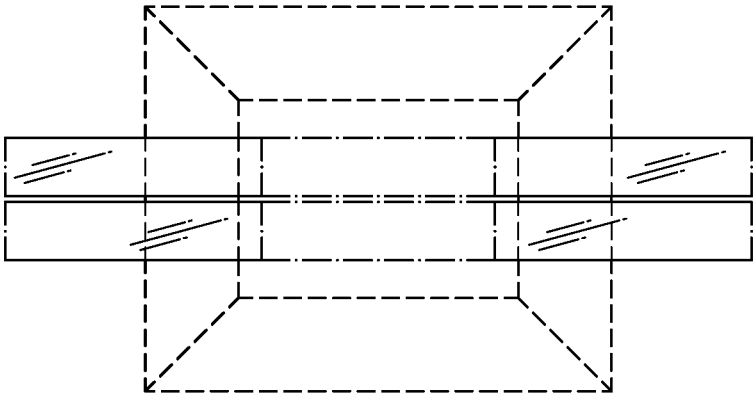
FIG. 11
(NEW)
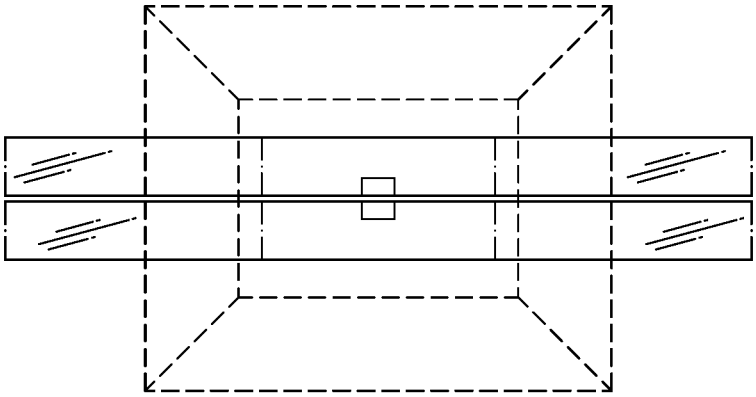
FIG. 12
(NEW)